(No Model.) 2 Sheets—Sheet 1.
E. PROUTY.
POWER TRANSMITTER FOR ROAD WAGONS.
No. 570,501. Patented Nov. 3, 1896.
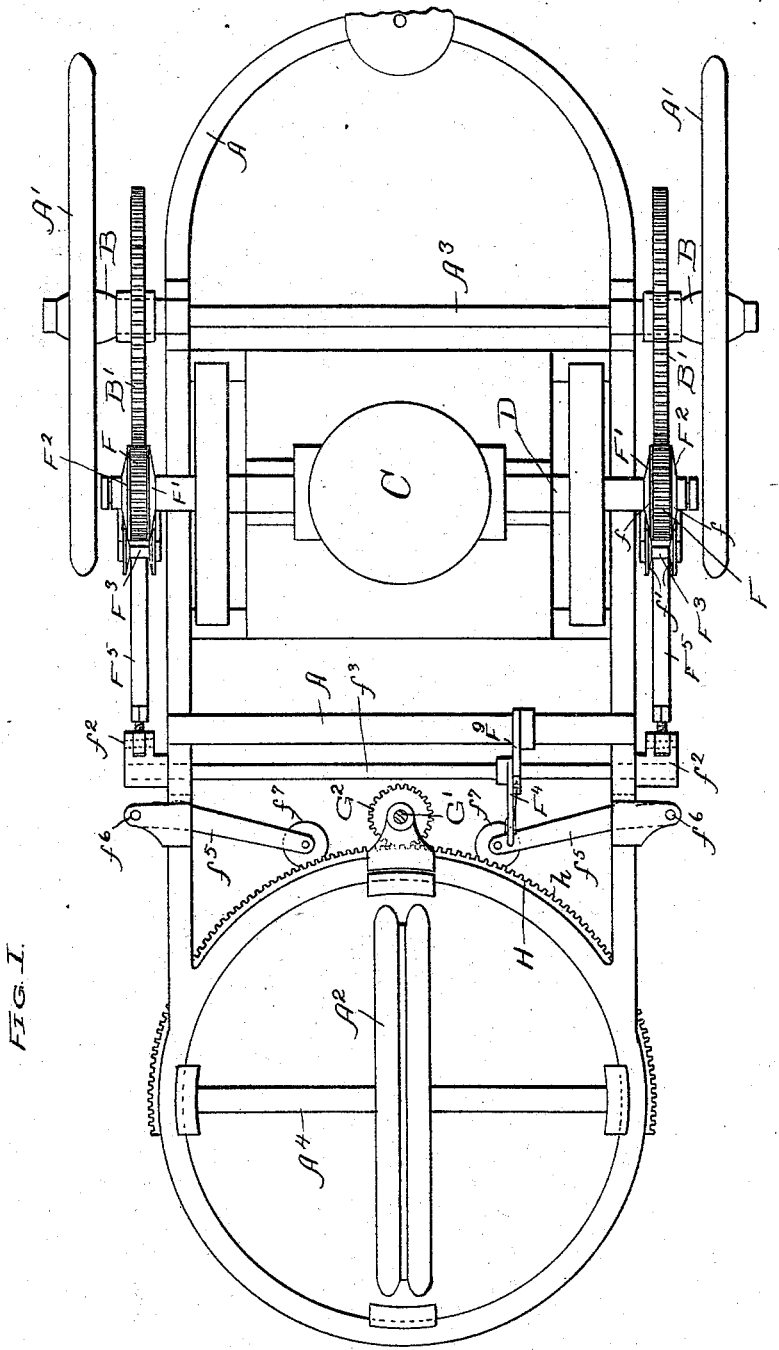
FIG. I.
WITNESSES
Lew. E. Curts
H. W. Munday
INVENTOR:
ENOCH PROUTY
BY Munday, Evarts & Adcock.
HIS ATTORNEYS.

(No Model.) 2 Sheets—Sheet 2.
E. PROUTY.
POWER TRANSMITTER FOR ROAD WAGONS.
No. 570,501. Patented Nov. 3, 1896.
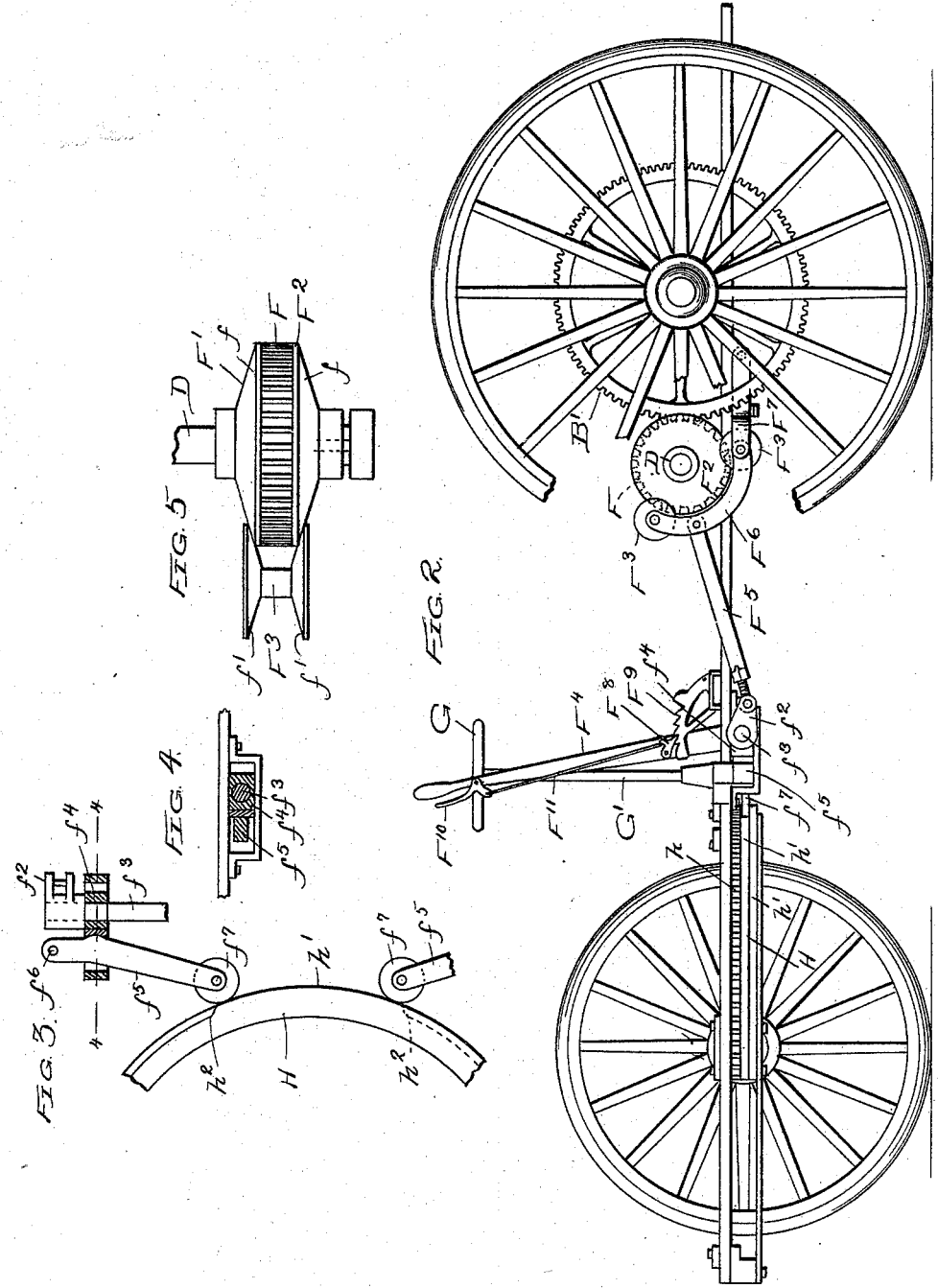
WITNESSES:
Sew. C. Curtis
A. W. Munday
INVENTOR:
ENOCH PROUTY
BY Munday, Evarts & Adcock
HIS ATTORNEYS.

UNITED STATES PATENT OFFICE.

ENOCH PROUTY, OF CHICAGO, ILLINOIS, ASSIGNOR OF ONE-HALF TO OLIVE S. PROUTY, OF SAME PLACE.

POWER-TRANSMITTER FOR ROAD-WAGONS.

SPECIFICATION forming part of Letters Patent No. 570,501, dated November 3, 1896.

Application filed April 27, 1896. Serial No. 589,286. (No model.)

*To all whom it may concern:*

Be it known that I, ENOCH PROUTY, a citizen of the United States, residing at Chicago, in the county of Cook and State of Illinois, have invented a new and useful Improvement in Power-Transmitters for Road-Wagons and other Conveyances or Machines, of which the following is a specification.

My invention relates to improvements in power-transmitting devices for road-wagons or other vehicles or machines.

The object of my invention is to provide a power-transmitting device or mechanism of a simple, strong, durable, and efficient construction by means of which power may be transmitted from the driving-shaft of an engine or other source of power to the driven shaft of a road-wagon or other conveyance or machine and the speed varied as required.

A further object is to so combine such power-transmitting mechanism with the steering-gear or mechanism of the wagon or vehicle that a less power or speed will be transmitted to the driving-wheel on the inner side than on the outer side of the vehicle when the steering-wheel is turned, so as to relieve somewhat the friction, loss of power, and straining of the vehicle when turning or passing around curves.

My invention consists in the means I employ to accomplish these results.

In the accompanying drawings, forming a part of this specification, Figure 1 is a plan view of a road-wagon embodying my invention. Fig. 2 is a side elevation. Fig. 3 is a detail plan view. Fig. 4 is a vertical section on the line 4 4 of Fig. 3, and Fig. 5 is a detail plan view of the power-transmitting device.

In the drawings similar letters of reference indicate like parts in all the figures.

In the drawings, A represents the frame of a road-wagon or other conveyance; A' A', its rear or driving wheels; $A^2$, its front wheel; $A^3$, the rear axle; B B, the driving-shafts, the same rotating on the axle $A^3$ independently of each other. C represents a gas-engine or other motor for propelling the vehicle, and D is its driving-shaft. All these parts are or may be of any ordinary or suitable construction familiar to those skilled in the art.

The driving-shaft D is furnished near each end with a loose pulley or gear F thereon, which is adapted to be gradually clutched to the driving-shaft, so as to revolve therewith, by means of two friction-disks $F' F^2$, one on each side of the gear or pulley F. Both of these friction-disks are keyed or splined so as to rotate with the shaft D, and one or both of them, preferably one, is adapted to slide on the shaft while rotating therewith. These two disks $F' F^2$ have slightly-beveled or cone-shaped outer faces $f$ $f$, and they are forced together so as to frictionally clamp the gear or pulley F between them by means of a rotatable spool or wheel $F^3$, having two bevel-faced flanges or collars $f'$ $f'$, adapted to engage the bevel-faces $f f$ of the disks $F' F^2$.

The flanged spool or wheel $F^3$ may be moved into and out of engagement with the disks $F'$ $F^2$ by any suitable means. I prefer to employ for this purpose a clutch-lever $F^4$, connected by a pivoted link $F^5$ with the spool $F^3$ or its hanger $F^6$.

I preferably employ two spools $F^3$ $F^3$, the same being connected together by the common hanger-bar $F^6$, upon which they are journaled. One end of the hanger-bar $F^6$ is connected by a pivoted arm or link $F^7$ with the frame, and near its other end the link $F^5$ is pivoted. The clutch-lever $F^4$ is provided with a pawl $F^8$, engaging a ratchet $F^9$, the pawl being operated by a pawl-lever $F^{10}$, connected by a link $F^{11}$ with the pawl.

As one of the disks $F' F^2$ is on each side of the gear or pulley F it will be observed that though the friction between the disks and the pulley is produced by a pressure in the direction of the axis of the shaft D, upon which the pulley is carried, this side pressure on the shaft is nevertheless equally balanced. There is therefore by this arrangement no side pressure or end thrust on the driving-shaft D of the engine or other motor tending to interfere with the proper operation thereof, or to produce friction or wear. As this clutch operates gradually and by friction to transmit the power of the engine or motor to the gear or pulley F the machinery or mechanism to which it is connected can be rotated at any speed desired, whatever the speed of the engine, and any amount of power desired transmitted, by simply moving the clutch-lever $F^4$ to a greater or less extent.

As illustrated in the drawings, two of these power-transmitting devices are employed, one on each side of the vehicle, for transmitting power simultaneously, but independently, to each of the driving-shafts B B of the vehicle. The driving-shafts B B are preferably connected to the gears F F by gears $B'$ $B'$, secured to the driving-shafts B B, which in this instance are hollow shafts or sleeves. A single clutch-lever $F^4$ is preferably employed for forcing together both pair of friction-disks $F'$ $F^2$ $F'$ $F^2$, the pivot of the clutch-lever being a rock-shaft $f^3$, and having two short arms $f^2$ $f^2$ to which the connecting-links $F^5$ $F^5$ are pivoted.

G is the steering-handle, the same being preferably a horizontal wheel having an upright shaft $G'$, furnished with a gear $G^2$, the teeth of which engage a segmental rack $h$ on the steering-wheel or fifth-wheel H, upon which the axle $A^4$ of the front wheel $A^2$ is mounted.

To enable the pressure between the friction-disks $F'$ $F^2$ and gear F to be slightly relieved when the vehicle is being turned, I mount the rock-shaft $f^3$ in slightly-movable bearings $f^4$ $f^4$, which are normally held in place by levers $f^5$, pivoted to the frame at $f^6$, and each having a friction-roller $f^7$ at its other end, which rides in a circular track or way $h'$, having a slight offset or cam $h^2$ into which the roller $f^7$ may come when the steering-wheel H is turned to turn the vehicle, thus allowing a slight movement of the rock-shaft $f^3$ away from the disks $F'$ $F^2$ and thereby slightly relieving the friction-pressure on the side toward which the vehicle is being turned. This enables the driving-wheel on this side to rotate slower or slip more easily, and thus facilitates the turning of the vehicle and avoids injurious strain on the frame and mechanism.

The tracks or ways $h'$ $h'$ complement each other, as is clearly illustrated in the drawings at Fig. 3, one track being slightly above the other, so that only one of the rollers $f^7$ can get into the inner part of its track at a time.

I claim—

1. The combination with a driving-shaft and a driven shaft, of a loose pulley or gear on the driving-shaft connected to the driven shaft, two friction-disks, one on each side of said gear or pulley, furnished with beveled outer faces, one of said disks being adapted to slide on said shaft, and a rotating spool or flanged wheel, the flanges of said spool or wheel being beveled or cone-faced, and a lever and connections for moving said spool or flanged wheel into contact with said disks, substantially as specified.

2. The combination with a driving-shaft, of a gear or pulley loose on said shaft, two friction-disks keyed to the shaft, one adapted to slide thereon and both provided with beveled outer faces, a clutch-lever $F^4$, hanger-bar $F^6$, links $F^5$ $F^7$, one connecting said hanger-bar with the clutch-lever and one with the frame, and two spools or flanged rollers mounted on said hanger-bar and engaging said friction-disks, substantially as specified.

3. In a road-wagon or other conveyance, the combination with a driving-shaft and two driven shafts, one for a wheel on each side of the conveyance, two loose pulleys or gears on said driving-shaft, two pairs of friction-disks embracing said loose pulleys or gears on the driving-shaft, one of each pair of said friction-disks being adapted to slide on said shaft, two rotatable spools or flanged wheels adapted to embrace said pairs of friction-disks, an operating-lever and a rock-shaft having arms connected to said spools or flanged wheels, a steering-wheel, movable bearings in which said rock-shaft is mounted, and mechanism connecting said movable bearings with the steering-wheel to enable the pressure and friction to be relieved between one pair of said friction-disks and one of said pulleys or gears when the conveyance is turned by the steering-wheel, substantially as specified.

4. In a conveyance, the combination of two driven shafts B B, with a driving-shaft D, having loose gears F F, and two pairs of friction-disks $F'$ $F'$ having bevel-faces, two spools $F^3$ $F^3$ having bevel-flanges, a lever-arm $F^4$ and rock-shaft $f^3$, having arms $f^2$ $f^2$ connected by links to said spools, a steering-wheel H, having tracks $h'$ $h'$, movable bearings $f^4$ $f^4$ for said rock-shaft $f^3$, and levers $f^5$ $f^5$ having friction-rollers $f^7$ $f^7$ riding in said tracks $h'$ $h'$, substantially as specified.

5. The combination with steering-wheel H having two cam-tracks $h'$ $h'$ of a rock-shaft $f^3$ having movable journals $f^4$ $f^4$, levers $f^5$ $f^5$ operated by said cam-tracks $h'$ $h'$ and serving to hold said movable journals in position, and two friction-clutch power-transmitting devices actuated by arms on said rock-shaft, substantially as specified.

6. A power-transmitting device comprising in combination a shaft D, a wheel F loose on said shaft and two friction-disks $F'$ $F^2$ mounted on said shaft and adapted to turn therewith one of said disks being also adapted to slide on said shaft, and a rotatable flanged wheel or spool adapted to embrace said friction-disks and force them against said wheel F, substantially as specified.

ENOCH PROUTY.

Witnesses:
 EDMUND ADCOCK,
 EDW. S. EVARTS.